U
nited States Patent [19]
Lydiate et al.

[11] 4,455,412
[45] Jun. 19, 1984

[54] PROCESS FOR POLYMERIZATION USING MONOPEROXYOXALIC ACID DIESTERS

[75] Inventors: Jack Lydiate, Viewbank; Anthony L. Marchese, Glen Waverley, both of Australia

[73] Assignee: ICI Australia Limited, Melbourne, Australia

[21] Appl. No.: 495,434

[22] Filed: May 17, 1983

[30] Foreign Application Priority Data

Jun. 1, 1982 [AU] Australia ............................... PF4235

[51] Int. Cl.$^3$ .......................... C08F 4/34; C08F 14/06
[52] U.S. Cl. ................................. 526/227; 526/232; 260/453 RZ
[58] Field of Search .............................. 526/227, 232; 260/453 RZ

[56] References Cited

U.S. PATENT DOCUMENTS 2,698,863  1/1955  Dickey ................................. 526/232
3,846,396  11/1974  D'Angelo et al. ............ 260/453 RZ
4,005,249  1/1977  Peterson et al. ..................... 526/227

FOREIGN PATENT DOCUMENTS 148217  5/1981  Fed. Rep. of Germany ...... 260/453 RZ

Primary Examiner—Joseph L. Schofer
Assistant Examiner—Peter F. Kulkosky
Attorney, Agent, or Firm—Cushman, Darby & Cushman

[57] ABSTRACT

The invention concerns a process for the polymerization of vinyl chloride monomer (VCM) using as initiator a diester of monoperoxyoxalic acid. The initiators are highly active and the process provides a method for the efficient polymerization of VCM at lower temperatures and/or for shorter reaction times than can be achieved with the current commercially available catalysts.

12 Claims, No Drawings

PROCESS FOR POLYMERIZATION USING MONOPEROXYOXALIC ACID DIESTERS

This invention relates to a process for the polymerization of vinyl monomers and in particular to a process for the polymerization of vinyl chloride monomer using a polymerization initiator comprising a diester of monoperoxyoxalic acid, and to polymers prepared according to the process of the invention.

The increasing cost of energy, labour and raw materials has led to a need to improve productivity in all sectors of the chemical industry, including the manufacture of poly(vinyl chloride).

The most common commercial procedure for the manufacture of poly(vinyl chloride) involves the use of a batch process in which vinyl chloride monomer is polymerized in aqueous suspension in an autoclave using free radicals to initiate the reaction. Conversion rates in such processes are high and therefore in order to improve productivity it is necessary to reduce reaction times.

One of the ways of reducing reaction times is to increase the amount of the initiator used. However, in practice it has been found that increasing the concentration of the commercially used initiators may lead to a marked deterioration in the heat stability of the poly(vinyl chloride) produced. Presumably this deterioration results from increased concentration of initiator residues in the product.

An alternative way of reducing reaction times is to use a more active initiator. However, while it might be expected that all organic compounds which have a low thermal stability and readily decompose to give free radicals would be effective initiators for the polymerization of vinyl chloride monomer, in practice it is found that the ease with which an organic compound generates free radicals is not a reliable measure of the usefulness of that compound as an initiator for the polymerization of vinyl chloride monomer. Moreover, some compounds which are more active than the initiators currently used for the polymerization of vinyl chloride monomer are too thermally unstable and/or shock sensitive to be of commercial use.

Clearly, there is a need in the art for more active initiators for the polymerization of vinyl chloride monomer.

It has now been found that a selected group of organic peroxides, namely the di-esters of monoperoxyoxalic acid, are very effective initiators for the polymerization of vinyl chloride monomer (VCM).

Accordingly the present invention provides a process for the production of a vinyl chloride polymer which process comprises the homo- or copolymerization of vinyl chloride at a temperature in the range of from 25° to 80° C. and a pressure in the range of from 1 to 20 kg/cm² in the presence of from 0.01 to 2%, by weight of the monomer, of a diester of monoperoxyoxalic acid.

Among the diesters of monoperoxyoxalic acid preferred for use as initiators in the process of the present invention are the esters of tertiary-alkylmonoperoxyoxalic acids, secondary-alkylmonoperoxyoxalic acids and benzylmonoperoxyoxalic acids, that is, esters of alkylmonoperoxyoxalic acids of formula II

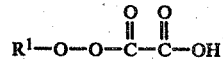

wherein $R^1$ is a secondary or tertiary alkyl group, or a benzyl or substituted benzyl group.

Included among the diesters of monoperoxyoxalic acid preferred for use as initiators in the process of the present invention are the tertiary-alkyl, secondary-alkyl and benzyl esters of the compounds of formula II, that is, compounds of formula I

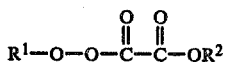

wherein $R^2$ is a secondary or tertiary alkyl group, or a benzyl group or a substituted benzyl group.

Included among the preferred diesters of monoperoxyoxalic acid of formula I are those compounds wherein $R^1$ and $R^2$ are independently selected from the group consisting of secondary and tertiary $C_4$ to $C_{10}$ alkyl, cyclohexyl, cyclohexyl substituted with $C_1$ to $C_6$ alkyl, benzyl, substituted benzyl wherein the benzene ring is substituted with $C_1$ to $C_6$ alkyl or $C_1$ to $C_6$ alkoxy, and 2-(2-phenylpropyl).

Included among the more preferred diesters of monoperoxyoxalic acid of formula I are those compounds wherein: $R^1$ is selected from the group consisting of tertiary-butyl, tertiary-pentyl, tertiary-hexyl and tertiary-heptyl; and $R^2$ is selected from the group consisting of tertiary-butyl, tertiary-pentyl, tertiary-hexyl, tertiary-heptyl, secondary-butyl, 2-pentyl, 3-pentyl, 2-hexyl, 3-hexyl, 2-heptyl, 3-heptyl, 4-heptyl, cyclohexyl, 4-(tertiary-butyl)cyclohexyl, benzyl, 4-methoxybenzyl and 2-(2-phenylpropyl).

Included among the even more preferred diesters of monoperoxyoxalic acid of formula I are those compounds wherein: $R^1$ is selected from tertiary-butyl and tertiary-pentyl; and $R^2$ is selected from the group consisting of tertiary-butyl, tertiary-pentyl, tertiary-hexyl, secondary-butyl, secondary-pentyl, 3-pentyl, cyclohexyl and 4-methoxybenzyl.

The process of the present invention may be applied to the production of vinyl chloride homopolymers or vinyl chloride copolymers containing at least 50 mole percent, and more preferably at least 80 mole percent, of units derived from vinyl chloride monomer. Monomers which may be copolymerized with vinyl chloride monomer include, for example: vinyl derivatives such as vinyl bromide, vinyl acetate, vinylidene chloride, N-vinylcarbazole, methyl vinyl ether, vinyl isobutyl ether and N-vinylpyrrolidone; α-olefins such as ethylene, propylene, butylene and isobutylene; acrylates such as acrylic acid, n-butyl acrylate, ethyl acrylate, methyl acrylate, 2-ethylhexyl acrylate, methacrylic acid, methyl methacrylate, ethyl methacrylate, n-butyl methacrylate and 2-ethylhexyl methacrylate; unsaturated nitriles such as acrylonitrile and methacrylonitrile; unsaturated dicarboxylic acid derivatives such as diallyl maleate, dibutyl maleate, diethyl fumarate, dimethyl itaconate and maleic anhydride; triallyl cyanurate, triallyl isocyanurate and trimethylolpropane trimethacrylate; and mixtures thereof.

The polymerization process of the invention may be carried out using any of the operating conditions customarily used for the homo- or co-polymerization of vinyl chloride monomer. Conventional processes for the preparation of vinyl chloride polymers include bulk polymerization, gas phase polymerization and polymerization in an aqueous medium by suspension or emulsion polymerization techniques.

In the process of the present invention, preferably, vinyl chloride monomer is homo- or co-polymerized using an aqueous suspension process with the aid of one or more suspending agents. Suitable suspending agent(s) for use in the process of the present invention may be chosen from those conventionally used in the art for the polymerization of vinyl chloride monomer in aqueous suspension. Such suspending agents include, for example, methylcellulose, hydroxymethylcellulose, hydroxyethylcellulose, hydroxypropylmethylcellulose, hydrolysed poly(vinyl acetate), gelatin, methyl vinyl ether—maleic anhydride copolymers, and mixtures thereof. A preferred suspending agent for use in the process of the present invention is partially hydrolysed poly(vinyl acetate) (PVAc).

The degree of hydrolysis of the currently commercially available PVAcs which may be used as suspension agents when the vinyl chloride monomer is polymerized in aqueous suspension according to the process of the present invention may vary within a large range. Usually the degree of hydrolysis of the PVAc is in the range of from 20 to 90 mole %. Preferably the degree of hydrolysis is in the range of from 60 to 90 mole %.

The partially hydrolysed PVAc may be used on its own as a suspension agent or in combination with a different type of suspension agent. The total amount of suspension agent used in the polymerization may vary widely and is generally between 0.05 and 2.0% by weight of the monomer.

The polymerization process of the invention is generally carried out at a temperature in the range of from 25° to 80° C. and preferably from 30° to 70° C. The pressure at which the polymerization reaction may be carried out ranges from atmospheric pressure to a pressure of 20 kg/cm$^2$ but the pressure is preferably below 15 kg/cm$^2$.

One of the significant advantages of the process of the present invention is that the high order of activity of the compounds of formula I enables the polymerization reaction to be carried out at lower temperatures and/or for shorter reaction times than can be achieved using the current commercially available "high activity" initiators. For example, the polymerization of vinyl chloride monomer (2.5 kg) in aqueous suspension using one of the most active commercially available initiators, bis(4-tert-butylcyclohexyl)peroxydicarbonate (37 mmole, effectively 74 mmole of scavengeable free radicals), under conventional reaction conditions at a temperature of 50° C. takes of the order of 120 minutes for completion. In contrast when vinyl chloride monomer (2.5 kg) is polymerized according to the process of the present invention using a compound of formula I as initiator, di(tert-butyl)monoperoxyoxalate (40 mmole; effectively 40 mmole of scavengeable free radicals), under identical reaction conditions at a temperature of 50° C. the reaction takes of the order of only 45 minutes for completion. That is, the reaction is of the order of 2.7 times faster at effectively half the initiator radical concentration.

In hindsight, it could be argued that it might be expected that organic peroxides, such as the compounds of formula I, which have a low thermal stability and readily decompose to give free radicals would be effective initiators for the polymerization of vinyl chloride monomer. However, in practice it is found that the ease with which an organic peroxide decomposes to give free radicals is not a measure of the usefulness of that compound as an initiator for the polymerization of vinyl chloride monomer.

For example, the half-lives of the initiators acetylcyclohexane sulfonyl peroxide (ACSP) and bis(4-tert-butylcyclohexyl)peroxydicarbonate (BCHP; one of the most active commercially available initiators) are of the order of 30 minutes and 160 minutes respectively (measured in benzene at a temperature of 50° C.) and therefore it might be expected that ACSP would be a considerably more active (faster) initiator than BCHP for the polymerization of vinyl chloride monomer. However, while ACSP begins to polymerize vinyl chloride monomer at a much faster rate than does BCHP; it appears that the ACSP may be rapidly exhausted as the higher rate of polymerization soon decreases. In the final analysis, under the same reaction conditions, a temperature of 50° C. and using the same molar concentration of initiators, ACSP polymerizes vinyl chloride monomer to 75% conversion only of the order of 1.1 times faster than does BCHP.

Moreover, some peroxides which have a low thermal stability and readily decompose to give free radicals are too thermally unstable and/or shock sensitive to be used for the polymerization of vinyl chloride mononer on a commercial scale.

Therefore, it is unexpected to find a group of organic peroxides which combine the favourable features of being very effective initiators for the polymerization of vinyl chloride monomer and having adequate handling stability for use as initiators for the polymerization of vinyl chloride monomer.

The advantages which flow from the process of the present invention enabling the polymerization of vinyl chloride monomer to be carried out at lower temperatures and/or more rapidly than heretofore possible will be evident to those skilled in the art. For example, significant savings in manufacturing costs may be realized by utilizing lower reaction temperatures and/or shorter reaction times. Moreover, polymers having improved properties may be obtained by carrying out the polymerization reaction at lower temperatures.

While the process of the present invention is especially advantageous in the low temperature polymerization of vinyl chloride monomer it may also be used to advantage in higher temperature polymerizations. For example, the initiators of formula I may be used on their own to effect shorter reaction times or they may be used together with another initiator in a mixed initiator system.

In some polymerization reactions mixed initiators may be used to particular advantage. For example, depending on the specific reaction conditions employed, a polymerization reaction according to the process of the present invention which uses a compound of formula I as the only initiator may not go to completion before the initiator is exhausted. If it is desired in the process of the present invention to utilize reaction conditions in which the initiator of formula I may be exhausted before the completion of the polymerization reaction, completion of the reaction may be effected by the use of a mixed initiator system comprising a compound of formula I and one of the less active, slower initiators. Suitable additional initiators may be chosen from those initiators known in the art to be suitable for use in the polymerization of vinyl chloride monomer including, for example, lauroyl peroxide, bis(4-tert-butylcyclohexyl)peroxydicarbonate, dibenzyl peroxide, diisopropyl peroxydicarbonate, tert-butyl peroxypivalate, azobisisobutyronitrile, azobis-2,4-dimethylvaleronitrile, sulfonyl peroxides and the like.

Compounds of formula I may be conveniently prepared by reacting an alcohol with oxalyl chloride followed by reacting the alkyl oxalyl chloride formed with an alkylhydroperoxide, as shown below.

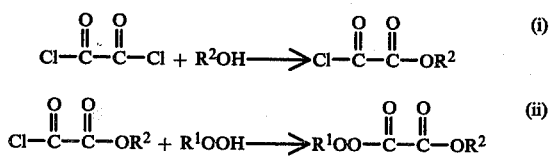

Alternatively, the compounds of formua I may be conveniently prepared by reacting an alkylhydroperoxide with oxalyl chloride followed by reacting the alkylmonoperoxyoxalyl chloride formed with an alcohol, as shown below.

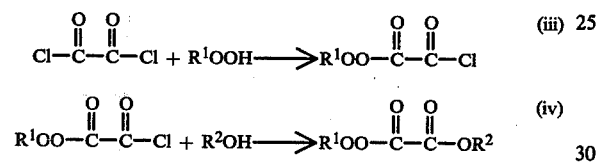

The reactions involving peroxides (ii, iii and iv above) are preferably carried out at a temperature of 0° C. or below in an anhydrous inert solvent such as an aliphatic or aromatic hydrocarbon. A base, for example pyridine, may be added to the reaction mixture to neutralize the hydrogen chloride formed in the reaction.

The compounds of formula I used as an initiator in the process of the present invention may be prepared as described above and stored, preferably at a low temperature, until ready for use. Alternatively, if minimum handling and storage of the initiator is desired, the compounds of formula I may be prepared in an adjacent reaction vessel and be transferred to the polymerization reaction vessel before the polymerization reaction is begun or the compound of formula I may be prepared in situ in the polymerization vessel.

The invention is now illustrated by the following non-limiting Examples.

EXAMPLE 1

Preparation of Di(tert-butyl)monoperoxyoxalate (1)

(a) A solution of tert-butanol (11 g; 0.15 mole) in petroleum spirit (200 ml) was added dropwise over a period of 1 hour to a stirred solution of oxalyl chloride (25.4 g; 0.2 mole) in petroleum spirit (80 ml) at ambient temperature. On completion of the addition the reaction mixture was stirred for a further three hours. The solvent was removed by distillation under reduced pressure and the product was fractionally distilled to give tert-butyl oxalyl chloride as a colourless liquid (19.7 g; 80%). bp 60° C. at a pressure of 29 mm of mercury.

(b) A solution of tert-butyl oxalyl chloride (19.6 g; 0.12 mole) in petroleum spirit (100 ml) was added dropwise over a period of 1 hour to a stirred solution of tert-butylhydroperoxide (10.8 g; 0.12 mole) and pyridine (9.4 g; 0.12 mole) in petroleum spirit (100 ml) at a temperature of −5° C. On completion of the addition the reaction mixture was stirred for a further hour at a temperature of −5° C. The reaction mixture was filtered and the pyridine hydrochloride which was collected was washed with a little ice-cold petroleum spirit. The filtrate was washed consequently with ice-cold aqueous 5% sulfuric acid, ice-cold aqueous 5% sodium carbonate and ice-cold water. The solution was then dried over anhydrous sodium sulfate and the solvent was removed by evaporation under reduced pressure at ice-bath temperature. Di(tert-butyl) monoperoxyoxalate was obtained as a colourless oil (22 g; 85%) and its infra-red spectrum showed the characteristic per-ester and ester carbonyl adsorptions of $\nu$1795 and 1760 cm$^{-1}$ respectively.

EXAMPLE 2

The following diesters of monoperoxyoxalic acid were prepared from the appropriate alcohol, oxalyl chloride and the appropriate alkylhydroperoxide following essentially the same procedure as that described in Example 1 parts (a) and (b):

sec-butyl tert-butylperoxyoxalate (7);
cyclohexyl tert-butylperoxyoxalate (8);
4-tert-butyl)cyclohexyl tert-butylperoxyoxalate (9);
3-pentyl tert-butylperoxyoxalate (10); and
sec-butyl tert-pentylperoxyoxalate (11).

EXAMPLE 3

Preparation of Di(tert-butyl)monoperoxyoxalate (1)

(a) A solution of tert-butyl hydroperoxide (9.0 g; 0.1 mole) in petroleum spirit (80 ml) was added dropwise over a period of 1 hour to a stirred solution of oxalyl chloride (25.4 g; 0.2 mole) in petroleum spirit (80 ml) at a temperature of 0° C. On completion of the addition the reaction mixture was stirred for a further 3 hours at a temperature of 0° C. The solvent and excess oxalyl chloride were evaporated under reduced pressure at ice bath temperature to give tert-butylperoxyoxalyl chloride as a colourless oil (16.6 g; 92%) suitable for use in further preparations.

(b) A solution of tert-butanol (7.4 g; 0.1 mole) and pyridine (7.9 g; 0.1 mole) in petroleum spirit (80 ml) was added dropwise over a period of 1 hour to a stirred solution of tert-butylperoxyoxalyl chloride (18.0 g; 0.1 mole) in petroleum spirit (100 ml) at a temperature of −5° C. On completion of the addition the reaction mixture was stirred for a further hour at a temperature of −5° C. The reaction mixture was filtered and the pyridine hydrochloride which was collected was washed with a little ice-cold petroleum spirit. The filtrate was washed consecutively with ice-cold aqueous 5% sulfuric acid, ice-cold aqueous 5% sodium carbonate and ice-cold water. The solution was then dried over anhydrous sodium sulfate and the solvent was removed by evaporation under reduced pressure at ice-bath temperature. Di(tert-butyl)monoperoxyoxalate was obtained as a colourless oil (16.4 g; 75%) and was identical by infra-red analysis to the sample prepared as described in Example 1.

EXAMPLE 4

The following esters of tert-butylmonoperoxyoxalic acid were prepared from tert-butylperoxyoxalyl chloride and the appropriate alcohol following essentially the same procedure as that described in Example 3 part (b):

tert-pentyl tert-butylperoxyoxalate (2);
4-methoxybenzyl tert-butylperoxyoxalate (3);
2-(2-phenylpropyl)tert-butylperoxyoxalate (4);
benzyl tert-butylperoxyoxalate (5); and
tert-hexyl tert-butylperoxyoxalate (6).

EXAMPLES 5-11

Water (3 650 ml) and the initiator di(tert-butyl)-monoperoxyoxalate were added to a 7.5 l stainless steel, jacketed and agitated autoclave. The autoclave was sealed, agitation was commenced and the autoclave was evacuated. A 1% w/w solution (384 ml) of partially hydrolysed poly(vinyl acetate) and vinyl chloride monomer (2.5 kg) were added to the autoclave. The vessel was heated to the reaction temperature and maintained at that temperature until the pressure in the reaction vessel dropped indicating completion of the reaction. The polymer was discharged from the reaction vessel and the yield and the properties of the polymer were determined. The reaction conditions and yield, and the properties of the polymer are recorded in Tables 1 and 2 below.

TABLE 1

Reaction Conditions

| Example No | Reaction Temperature (°C.) | Initiator Concentration (mmole) | Reaction Time to Pressure Drop (min) | Yield (%) |
|---|---|---|---|---|
| 5 | 35 | 40 | 120 | 85 |
| 6 | 40 | 40 | 103 | 74 |
| 7 | 45 | 40 | 81 | 76 |
| 8 | 45 | 50 | 43 | — |
| 9 | 50 | 40 | 45 | 80 |
| 10 | 50 | 40 | 35 | 79 |
| 11 | 55 | 35 | No drop | 56 |

TABLE 2

Polymer Properties

| Property | 5 | 6 | 7 | 9 | 10 | 11 |
|---|---|---|---|---|---|---|
| A.D. | 392 | 429 | 435 | 465 | 445 | 541 |
| K | 77.8 | — | 70.3 | 64.8 | — | 61.3 |
| C.P.A. | 37.3 | 34.3 | 33.4 | 26.6 | 33.8 | 30.5 |
| G.S.D. | | | | | | |
| <81 | 4.0 | 3.5 | 1.7 | 14.2 | 1.2 | 4.8 |
| >256 | 5.3 | 0 | 4.2 | 0 | 6.6 | 0.3 |

Property Code:
A.D.—Apparent Density, expressed in g/l.
K—K-value (ISO test), a measure of the intrinsic viscosity of a dilute solution of PVC in cyclohexanone at 25° C. determined by the ISO test method.
C.P.A.—Cold Plasticizer Absorption, the percent by weight of the plasticizer di-isooctyl phthalate absorbed by a fixed mass of resin over a period of one hour at a temperature of 25° C.
G.S.D.—Granule Size Distribution (measured by Coulter Counter); expressed as the percent by weight of the polymer of size below 81μ and above 256μ.

EXAMPLES 12-26

These Examples illustrate the use of diesters of monoperoxyoxalic acid as initiators for the polymerization of vinyl chloride monomer and diesters of monoperoxyoxalic acid in admixture with bis(4-tert-butylcyclohexyl)peroxydicarbonate as mixed initiator systems for the polymerization of vinyl chloride monomer.

The general procedure described for Examples 5 to 11 was repeated replacing the polymerization initiator di(tert-butyl)monoperoxyoxalate with the initiator or mixture of initiators indicated. Examples 12 to 20 and 24 to 26 were carried out using exactly the same scale described for Examples 5 to 11. Examples 21 and 23 were carried out using a 35 l autoclave on five times the scale described for Examples 5 to 11. All polymerization reactions were run at a temperature of 51° C.

The initiator and the amount thereof used, the reaction time to pressure drop and the polymer yields are recorded in Table 3 below and the polymer properties are recorded in Table 4 below.

The initiators used in Examples 12 to 26 were as follows:

| Example No | Code | Initiator |
|---|---|---|
| 12 | PBPO | tert-pentyl tert-butylperoxyoxalate |
| 13 | HBPO | tert-hexyl tert-butylperoxyoxalate |
| 14 | SBPO | sec-butyl tert-butylperoxyoxalate |
| 15 | CBPO | cyclohexyl tert-butylperoxyoxalate |
| 16 | PBPO | 3-pentyl tert-butylperoxyoxalate |
| 17 | PSPO | tert-pentyl sec-butylperoxyoxalate |
| 18-23 | BMPO | di(tert-butyl)monoperoxyoxalate and |
| | BCHP | bis(4-tert-butylcyclohexyl)peroxydicarbonate |
| 24 | MBBPO | 4-methoxybenzyl tert-butylperoxyoxalate and |
| | BCHP | bis(4-tert-butylcyclohexyl)peroxydicarbonate |
| 25 | SBPO | sec-butyl tert-butylperoxyoxalate and |
| | BCHP | bis(4-tert-butylcyclohexyl)peroxydicarbonate |
| 26 | PSPO | tert-pentyl sec-butylperoxyoxalate and |
| | BCHP | bis(4-tert-butylcyclohexyl)peroxydicarbonate |

TABLE 3

| Example No | Initiator Type | Concentration (mmole) | Reaction Time to Pressure Drop (min) | Yield (%) |
|---|---|---|---|---|
| 12 | PBPO | 38 | 26 | 87 |
| 13 | HBPO | 35 | 25 | 85 |
| 14 | SBPO | 30 | 77 | 87 |
| 15 | CBPO | 30 | 63 | 90 |
| 16 | PBPO | 30 | 63 | 85 |
| 17 | PSPO | 30 | 44 | 88 |
| 18 | BMPO | 9 | 143 | 87 |
| | BCHP | 10 | | |
| 19 | BMPO | 9 | 165 | — |
| | BCHP | 10 | | |
| 20 | BMPO | 18 | 121 | 83 |
| | BCHP | 10 | | |
| 21 | BMPO | 13.5 | 240 | — |
| | BCHP | 28 | | |
| 22 | BMPO | 21 | 193 | 85 |
| | BCHP | 28 | | |
| 23 | BMPO | 42 | 108 | 84 |
| | BCHP | 45 | | |
| 24 | MBBPO | 35 | 84 | 85 |
| | BCHP | 2.5 | | |
| 25 | SBPO | 10 | 129 | 92 |
| | BCHP | 10 | | |
| 26 | PSPO | 10 | 115 | 86 |
| | BCHP | 10 | | |

TABLE 4

Polymer Properties

| Property | 13 | 14 | 15 | 16 | 17 | 25 | 26 |
|---|---|---|---|---|---|---|---|
| A.D. | 482 | 449 | 442 | 432 | 450 | 428 | 452 |
| K | 66.8 | — | 69.3 | 68.7 | 65.4 | 71.6 | 71.2 |
| C.P.A. | 29.1 | 27.4 | 30.9 | 32.3 | 29.0 | 23.4 | 23.8 |
| G.S.D. | | | | | | | |

TABLE 4-continued

| | Polymer Properties | | | | | | |
|---|---|---|---|---|---|---|---|
| | Example No | | | | | | |
| Property | 13 | 14 | 15 | 16 | 17 | 25 | 26 |
| <81 | 4.0 | 4.9 | 6.5 | — | 2.0 | 3.0 | 3.0 |
| >256 | 0.5 | 3.0 | 0 | — | 2.0 | 0 | 0 |

*For property code see Examples 5 to 11 Table 2.

COMPARATIVE EXAMPLES A, B, C and D

In order to compare the effectiveness of the polymerization process of the invention to prior art polymerization processes the general reaction procedure described in Examples 5 to 11 was repeated replacing the polymerization initiator di(tert-butyl)monoperoxyoxalate with either bis(4-tert-butylcyclohexyl)-peroxydicarbonate (BCHP; one of the most active commercially available initiators for the polymerization of vinyl chloride monomer) or a mixture of BCHP and lauroyl peroxide (LP).

The reaction conditions are detailed in Table 5 below and the polymer properties are detailed in Table 6 below.

The Comparative Examples show that the prior art processes for the polymerization of vinyl chloride monomer using BCHP or BCHP and LP as initiators give poly(vinyl chloride) having comparable properties with the polymer produced by the process of the present invention. However, it is clear that the time required for the completion of the prior art polymerization process is considerably longer than the time required for the completion of the polymerization process of the present invention. For example, when vinyl chloride monomer (2.5 kg) was polymerized at a temperature of 51° C. using BCHP (37 mmoles; effectively 74 mmoles of scavengeable free radicals) as initiator the reaction time to pressure drop was 120 min (Comparative Example B, Table 5). In contrast when the same amount of vinyl chloride monomer was polymerized under the same conditions using di(tert-butyl)monoperoxyoxalate (40 mmoles; effectively 40 mmoles of scavengeable free radicals) as initiator the reaction time to pressure drop was only 45 minutes (Example 9, Table 1). That is, the reaction was of the order of 2.7 times faster at effectively half the initiator radical concentration.

TABLE 5

| | Reaction Conditions | | | | |
|---|---|---|---|---|---|
| | | Initiator Concentration | | | Reaction |
| Example No | Reaction Temperature (°C.) | Initiator | % w/w based on VCM | (mmoles) | Time (to pressure drop; min) |
| A | 51 | BCHP | 0.16 | 10 | 228 |
| B | 51 | BCHP | 0.60 | 37 | 120 |
| C | 57 | BCHP | 0.08 | 5 | 240 |
| D | 70 | BCHP + LP | 0.04 0.04 | 2.5 2.5 | 245 |

TABLE 6

| | Polymer Properties | | | |
|---|---|---|---|---|
| | Example No | | | |
| Property* | A | B | C | D |
| A.D. | 565 | 521 | 585 | 623 |
| K | 71.7 | 70.8 | 66.5 | 56.9 |
| C.P.A. | 25.6 | 26.5 | 23.8 | 10.7 |
| G.S.D. | | | | |

TABLE 6-continued

| | Polymer Properties | | | |
|---|---|---|---|---|
| | Example No | | | |
| Property* | A | B | C | D |
| <81 | 0.3 | 2.9 | 5.0 | 0.1 |
| 102–203 | 92.1 | 86.2 | 83.0 | 93.6 |
| 203–256 | 7.4 | 7.7 | 6.8 | 2.5 |
| >256 | 0.3 | 0.8 | 0 | 0.5 |

*For property code see Examples 5 to 11 Table 2.

I claim:
1. A process for the production of a vinyl chloride polymer which process comprises the homo- or copolymerization of vinyl chloride at a temperature in the range of from 25° to 80° C. and at a temperature in the range of from 1 to 20 kg/cm² in the presence of from 0.01 to 2%, by weight of the monomer, of a diester of monoperoxyoxalic acid.

2. A process according to claim 1 wherein the diester is an ester of a monoperoxyoxalic acid ester of formula

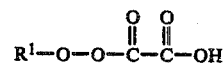

wherein R¹ is selected from the group consisting of secondary alkyl, tertiary alkyl, benzyl and substituted benzyl.

3. A process according to claim 1 wherein the diester is a monoperoxyoxalic acid diester of formula

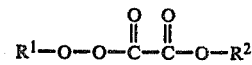

wherein R¹ and R² are independently selected from the group consisting of secondary alkyl, tertiary alkyl, benzyl and substituted benzyl.

4. A process according to claim 3 wherein the diester is a monoperoxyoxalic acid diester of formula

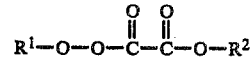

wherein R¹ and R² are independently selected from the group consisting of secondary and tertiary C₄ to C₁₀ alkyl, cyclohexyl, cyclohexyl substituted with C₁ to C₆ alkyl, benzyl, substituted benzyl wherein the benzene ring is substituted with C₁ to C₆ alkyl or C₁ to C₆ alkoxy, and 2-(2-phenylpropyl).

5. A process according to claim 4 wherein the diester is a monoperoxyoxalic acid diester of formula

wherein: R¹ is selected from the group consisting of tertiary-butyl, tertiary-pentyl, tertiary-hexyl and tertiary-heptyl; and R² is selected from the group consisting of tertiary-butyl, tertiary-pentyl, tertiary hexyl, tertiary-heptyl, secondary-butyl, 2-pentyl, 3-pentyl, 2-hexyl, 3-hexyl, 2-heptyl, 3-heptyl, 4-heptyl, cyclohexyl, 4-(tertiary-butyl)cyclohexyl, benzyl, 4-methoxybenzyl and 2-(2-phenylpropyl).

6. A process according to claim 5 wherein the diester is a monoperoxyoxalic acid diester of formula

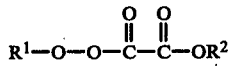

wherein: $R^1$ is selected from tertiary-butyl and tertiary-pentyl; and $R^2$ is selected from the group consisting of tertiary-butyl, tertiary-pentyl, tertiary-hexyl, secondary-butyl, secondary-pentyl, 3-pentyl, cyclohexyl and 4-methoxybenzyl.

7. A process according to claim 6 wherein the diester is a monoperoxyoxalic acid diester selected from the group consisting of tertiary-hexyl tertiary-butylperoxyoxalate, tertiary-pentyl tertiary-butylperoxyoxalate, di(tertiary-butyl)monoperoxyoxalate and secondary-butyl tertiarypentylperoxyoxalate.

8. A process according to claim 1 wherein the vinyl chloride monomer is homo- or co-polymerized in aqueous suspension with the aid of at least one suspension agent.

9. A process according to claim 8 wherein the suspension agent is partially hydrolysed poly(vinyl acetate).

10. A process according to claim 1 wherein the polymerization process is carried out at a temperature in the range of from 30° to 70° C.

11. A process according to claim 10 wherein the compound of formula I is either prepared in an adjacent reaction vessel and transferred to the polymerization reaction vessel before the polymerization is begun or prepared in situ in the polymerization vessel before the polymerization reaction is begun.

12. A process according to claim 1 wherein the polymerization reaction is carried out in the presence of at least one other polymerization initiator in addition to the compound of formula I.

* * * * *